W. WANSTALL.
VALVE FOR STEAM TRAPS.
APPLICATION FILED JAN. 14, 1921.
1,419,784.
Patented June 13, 1922.
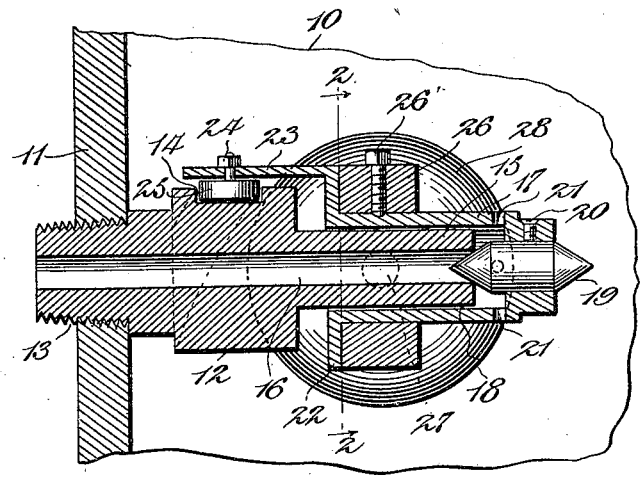
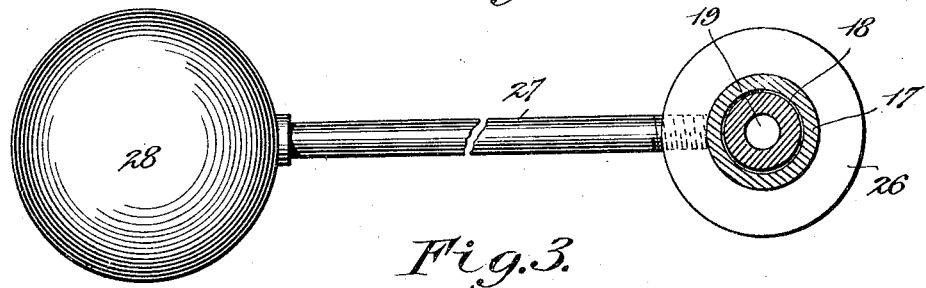
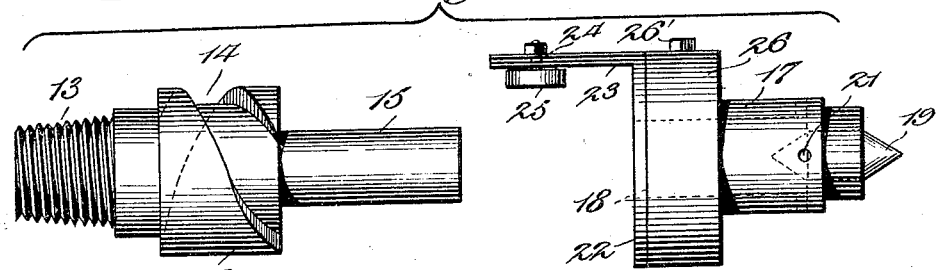
William Wanstall, INVENTOR
BY Victor J. Evans, ATTORNEY
WITNESS:

UNITED STATES PATENT OFFICE.

WILLIAM WANSTALL, OF NEW YORK, N. Y.

VALVE FOR STEAM TRAPS.

1,419,784.	Specification of Letters Patent.	Patented June 13, 1922.

Application filed January 14, 1921. Serial No. 437,229.

*To all whom it may concern:*

Be it known that I, WILLIAM WANSTALL, a citizen of the United States, residing at New York city, in the county of New York and State of New York, have invented new and useful Improvements in Valves for Steam Traps, of which the following is a specification.

This invention relates to improvements in valves for steam traps, and one of the principal objects is to produce a device of this nature which will operate easily by means of a float even when under high pressure.

Another object is to produce a device of this nature which will be simple of construction, cheap to manufacture, and highly efficient for the purpose for which it is intended.

With these and other objects in view which will be more apparent as the specification proceeds, the invention resides in certain novel construction and combination and arrangement of parts, the essential features of which are hereinafter fully described, particularly pointed out in the appended claims and illustrated in the accompanying drawing, in which :—

Figure 1 is a vertical sectional view of a steam trap provided with my improvement.

Fig. 2 is a vertical sectional view in line 2—2 of Figure 1.

Figure 3 is a detached elevational view of the members comprising the valve.

Like characters of reference refer to like parts in all views.

Referring to the drawing in detail, 10 represents a steam trap generally, provided with an end wall 11 to which the valve is secured.

A member 12 is provided with a reduced and threaded portion 13 which is seated in the wall 11 and extended therebeyond for connection to the outlet pipe. This member 12 is also provided intermediate its ends with a spirally cut groove or way 14. The inner end of member 12 is reduced as shown at 15, and a duct 16 extends from end to end of member 12.

A member 17 is formed as a sleeve with a bore 18, into one end of which extends the portion 15 of member 12, the other end of bore 18 being closed by a member 19 secured in place by a set screw 20 and conically shaped at both ends so that when worn at one end, it may be reversed. The inner conical end of member 19 is in line with duct 16 and normally stands in the mouth of said duct so as to prevent the flow through the said duct. Transverse apertures 21 give access to bore 20 from the trap. The end of member 17 is formed with a broad shoulder or flange 22 facing toward the wall 11, and this flange has at its upper portion an arm 23 which stands out over the enlarged central portion of member 12 and carries a depending stud 24 upon which is mounted an anti-friction roller 25 travelling in groove 14. It is, of course, understood that two or more arms and rollers could be provided, but on account of the great increase in cost of manufacture of the device and the very slight mechanical advantage to be obtained, the preferred form is as shown.

Mounted on the member 17 adjacent to flange 22 is a collar 26 which may be secured in place by a set screw 26'. If preferred collar 26 may be cast integral with member 17. Secured in said collar is one end of the float bar 27, to the free end of which is secured the float 28.

In operation, when the water in the trap rises it raises the float 28 which through bar 27 and collar 25, rotates the members 17, and the roller 25 travelling in groove or way 14 effects movement of member 17 away from wall 11 thereby withdrawing member 19 from duct 16 and permitting egress of the water through said duct until said float has been lowered sufficiently to bring the member 19 back into sealing relation with duct 16.

While I have described what is deemed to be the most desirable embodiment of my invention, it is obvious that many of the details may be varied without in any way departing from the spirit of my invention, and I therefore do not limit myself to the exact details of construction herein set forth nor to anything less than the whole of my invention limited only by the appended claims.

What is claimed as new is :—

1. In a device of the class described, the combination of a member having an outlet opening and a spiral groove formed in it, a second member mounted for rotary and sliding movement on the first said member, a roller carried by the second said member and travelling in the said spiral groove, a closure member mounted in the second said member and adapted to close the outlet opening in the first said member, and a float connected to the second said member for operating the same to render said closure member effective and ineffective.

2. In a device of the class described, the combination of a member having an outlet opening and a spiral groove formed in it, a second member mounted for rotary and sliding movement on the first said member, a roller carried by the second said member and travelling in the said spiral groove, a reversible closure member mounted in the second said member and adapted to close the outlet opening in the first said member, and a float connected to the second said member for operating the same to render said closure member effective and ineffective.

3. A device of the class described comprising an outlet member having an outlet duct therethrough and a spiral groove formed therein, a bushing mounted on said outlet member, an arm formed on said bushing, a roller supported on said arm and riding in said groove, a conical closure member mounted in said bushing member and adapted to be moved into and out of closing relation with said duct upon operation of said bushing member, and means for operating said bushing.

In testimony whereof I have affixed my signature.

WILLIAM WANSTALL.